United States Patent [19]

Kearney

[11] 4,375,026
[45] Feb. 22, 1983

[54] WELD QUALITY MONITOR

[75] Inventor: Frank W. Kearney, Champaign, Ill.

[73] Assignee: The United States of America as represented by the Secretary of the Army, Washington, D.C.

[21] Appl. No.: 268,216

[22] Filed: May 29, 1981

[51] Int. Cl.³ .............................................. B23K 9/10
[52] U.S. Cl. ........................... 219/130.01; 219/130.21
[58] Field of Search ..................... 219/130.01, 137 PS, 219/130.21

[56] References Cited

U.S. PATENT DOCUMENTS

| 3,236,997 | 2/1966 | Johnson et al. | |
|---|---|---|---|
| 3,262,006 | 7/1966 | Sciaky et al. | |
| 3,370,151 | 2/1968 | Normando | |
| 3,509,314 | 4/1970 | Freytag | 219/137.71 |
| 4,103,141 | 7/1978 | Wristen | 219/130.01 |

FOREIGN PATENT DOCUMENTS

| 2811737 | 9/1979 | Fed. Rep. of Germany | 219/130.01 |
|---|---|---|---|
| 2813259 | 10/1979 | Fed. Rep. of Germany | 219/130.01 |
| 2813284 | 10/1979 | Fed. Rep. of Germany | 219/130.01 |
| 2813339 | 10/1979 | Fed. Rep. of Germany | 219/130.01 |
| 142677 | 7/1980 | German Democratic Rep. | 219/130.01 |

Primary Examiner—C. C. Shaw
Attorney, Agent, or Firm—Darrell E. Hollis

[57] ABSTRACT

Weld arc voltage, weld arc current and weld arc travel speed are monitored on a real-time basis during the welding process. Each monitored quantity or parameter is compared directly with a reference value indicative of a high quality weld, and an alarm is activated when a preselected variation in the measured and the reference quantities occurs. The monitored quantities are also used to calculate additional welding parameters, including heat input, weld bead area and cooling rate. These parameters are also compared to ideal reference values in order to control weld quality.

The sensors used for measuring the welding parameters are selected so as to provide minimal interference with the welding process. For example, Hall effect transductors are used for current measurements, while a unique opto-electronic noncontacting sensor is used for measuring the weld speed.

10 Claims, 3 Drawing Figures

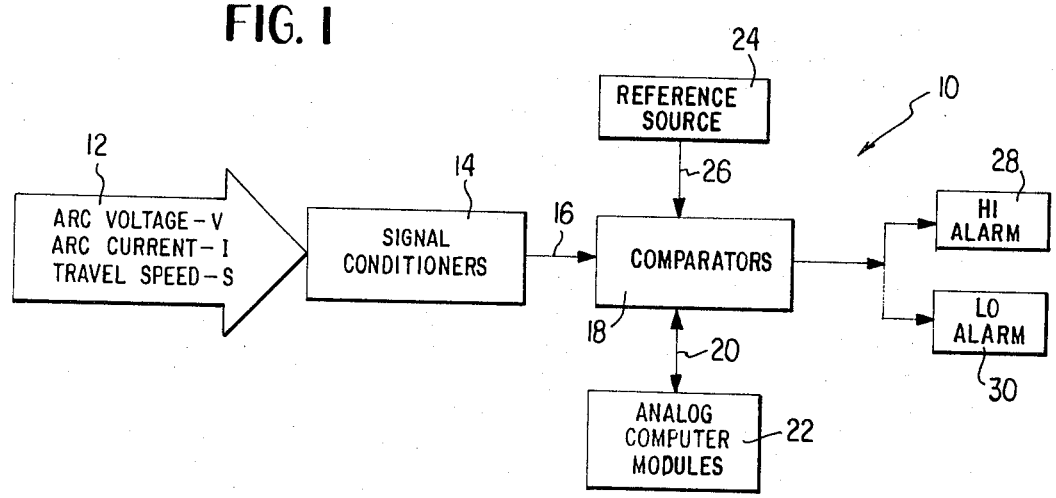
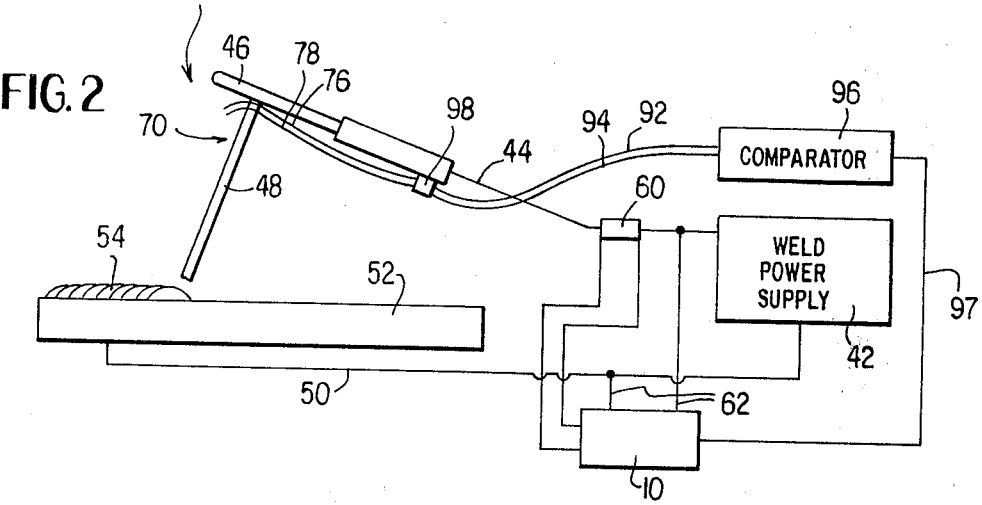
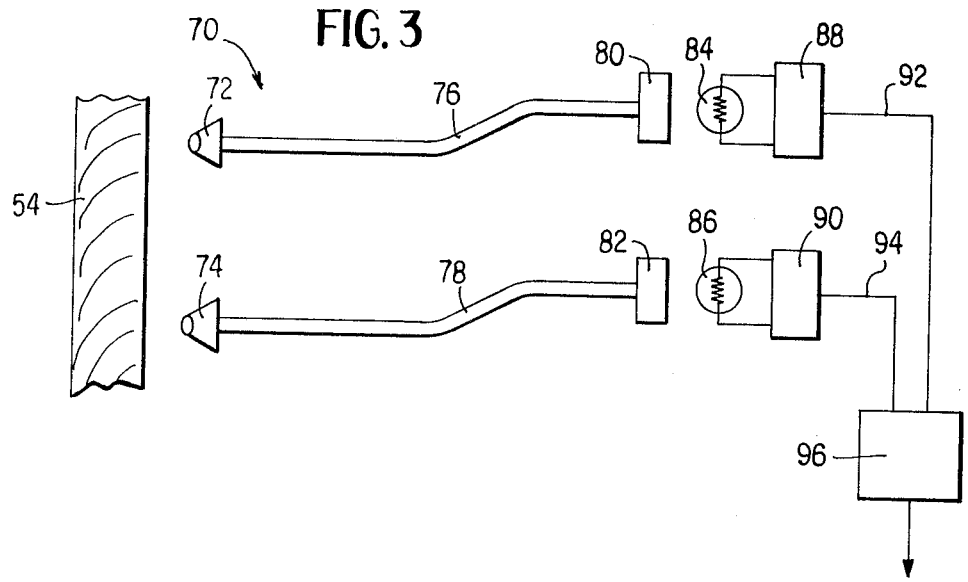

WELD QUALITY MONITOR

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

1. Field of the Invention

This invention relates generally to systems directed toward monitoring welding processes, and more particularly to systems which are adapted to provide immediate, real-time indications of degradation in a weld bead from an optimum weld bead as the acutal weld bead is bing produced.

2.Related Art

There are two commonly used field welding processes-- shielded metal-arc (stick electrodes) and gas metal-arc (bare wire). In both types, the source of heat for melting the weld material is an electric welding arc. Such an electric welding arc can be viewed as a gaseous conductor that changes electrical energy into heat. The welding arc can be defined as a particular group of electrical discharges that are formed and sustained by the development of a gaseous conductive media. The current carriers for the gaseous medium are produced by thermal means and field emission.

The arc current is carried by the plasma, the ionized state of a gas, which is composed of nearly equal numbers of electrons and ions. Mixed with the plasma are other states of matter, such as molten metals, slags, vapors, neutral and excited gaseous atoms and molecules.

During the welding process, changes in arc voltage, travel speed, and heat input can occur without the operator's knowledge. These changes can cause defects in the deposited metal weld bead.

Porosity is a weld defect consisting of a void or gas pocket trapped in the solidifying weld metal. The reduced solubility of the gas in the metal caused by the decreasing temperature forces the gas out of molten solution. Gases are originally introduced either by poor shielding, which contains air, or by chemical reactions in the molten metal weld. With stick electrodes, too long an arc resulting from excessive arc voltage can reduce the shielding effectiveness, thus introducing gas.

Slag inclusion is another defect caused by the entrapment of an oxide or other non-metallic material under the weld seam. The major source of slag is the coating on stick electrodes. This defect is also related to the heat input to the weld.

Incomplete fusion is another defect caused by the failure of adjacent layers of the weld metal or weld base plate to fuse. Incomplete fusion may result when the adjacent metal is not heated to the melting point because of insufficient heat input.

Another defect is an undercut, which is a groove melted into the base plate at the toe of the weld and is caused primarily by excessive travel speed in relation to the welding current.

The cost of locating and repairing the defects set forth above can be a major portion of weld construction costs. Welding inspection, for example, can constituted 25%–40% of the weld fabrication costs. In addition, weld defects decrease service life of welded joints.

The cooling cycle after a weld pass determines the microstructure of the weld metal in the heat-affected zone. With fast cooling rates, some steels become very hard because of martensitic transformation. If the cooling is sufficiently slow, the metal may become more ductile, and the structure ferritic and pearlitic. The type of steel generally determines which of these structures is desired. For low carbon and low alloy steels, the pearlitic structure is desirable, while, for high strength quenched and tempered steel, the martensitic structure is desirable.

Control of the arc parameters can be used to control the amount of heat generated in the welding process, the length of time the weld material remains at an elevated temperature and the cooling rate of the weld zone. Consequently, it is desirable to monitor the appropriate welding parameters in order to detect, identify and locate variations from optimum parameters. A weld monitor with a real-time output would aid the inspector in designating suspect areas for non-destructive testing after welding. Further, a real-time weld quality monitor could be used to interpret welding when defects are occurring, thus precluding costly rework.

Various attempts have been made at providing systems for monitoring certain weld parameters. For example, U.S. Pat. No. 3,236,997 to Johnson et al shows a system for controlling the length of a welding arc of a consumable electrode welding system. The control system employs a photosensitive transducer, such as a photodiode, which is positioned to sense the illumination emitted by the arc.

U.S. Pat. No. 3,262,006 to Sciaky et al shows a welding control system which is responsive to the radiation intensity of the welding arc for controlling the position of a nonconsumable electrode.

U.S. Pat. No. 3,370,151 to Normando shows a control system using radiant energy detector scanning. The system employs a radiation sensitive means, such as a photocell, which is sensitive to infrared radiation or, alternatively, to a mixture of infrared and visible red radiation.

OBJECTS OF THE INVENTION

One object of the present invention is to provide a weld quality monitor which is capable of monitoring essential welding parameters without interfering with the welding process being carried out or causing degradation in the weld bead being produced.

A further object of the present invention is to provide a weld quality monitor which can be easily connected to an in situ welding apparatus.

Another object of the present invention is to provide a weld quality monitor which has the capability of calculating and monitoring heat input, nugget area, and cooling rate of the weld bead being produced, and notifying the weld operator when any of these parameters exceeds preset limits.

A further object of the present invention is to provide a weld quality monitor which can be easily transported for use at various field locations.

Finally, an additional object of the present invention is to provide a weld quality monitor which is extremely durable in use and is designed for fabrication with large scale integrated circuit components to increase reliability and accuracy of the system.

SUMMARY OF THE INVENTION

In accordance with the above and other objects, the present invention comprises a weld quality monitor having sensors for sensing the weld voltage, weld current and weld speed of an electric arc welding machine. The monitor includes a comparator for comparing each of the weld voltage signal, weld current signal and weld speed signal with a reference signal indicative of optimum welding conditions.

An additional feature of the present invention resides in the inclusion of a calculator which receives the voltage signal, current signal and speed signal as inputs, and produces output signals indicative of weld heat input, weld nugget area and cooling rate based thereon.

An additional feature of the present invention resides in the sensors used for measuring the various welding parameters. A unique noncontacting opto-electronic sensor is used for measuring weld speed, and a Hall effect transductor is used for the weld current measurement. These sensors provide accurate signals without interfering with the welding process.

BRIEF DESCRIPTION OF THE DRAWINGS

Additional objects and features of the present invention will become readily apparent when the same is set forth in greater detail in the accompanying Detailed Description of the Preferred Embodiment with reference being made to the drawing in which like reference numerals represent like or similar parts throughout and in which:

FIG. 1 is a block diagram illustration of the monitor of the present invention;

FIG. 2 is a schematic representation of the monitor of the present invention showing the interconnections with a welding machine; and FIG. 3 shows the noncontacting opto-electronic speed sensor used in the monitor of the present invention.

DESCRIPTION OF THE PREFERRED EMBODIMENT

Now with reference to the Figures, a weld quality monitor incorporating the principles and concepts of the present invention and generally referred to by the reference numeral 10 will be described in detail.

With particular reference to FIG. 1, it can be seen that the weld quality monitor 10 receives input signals 12 indicative of the arc voltage (V), the arc current (I), and the arc travel speed (S). These input signals are derived in a manner to be described hereinafter from any commonly used electric arc welding apparatus, the most prevalent of these being the shielded metal arc (stick electrodes) and the gas metal arc (bare wire) systems. The input signals 12 are passed through a signal conditioners 14 on a line 16 to comparators 18. The signal conditioners 14 can be of any conventional design having the purpose of conditioning input signals 12 to be compatible with the remaining circuitry of the invention. The conditioned signals are also provided via a line 20 to analog computer modules 22, whose function will be described below.

Comparators 20 also receive signals from a reference source 24 through a line 26. These signals are indicative of the optimum operating values for the arc voltage, arc current and travel speed. Comparators 20 can be of any conventional design, such as standard integrated circuit operational amplifiers. A separate comparator is provided for each of the input signals 12. Each comparator receives one reference source signal from source 24. When any input signal 12 deviates substantially from the associated reference source signal, one of alarms 28 and 30 is activated, depending on whether the measured signal 12 is higher or lower than the associated reference source signal from line 26.

In addition to directly comparing the input signals 12 to reference source signals from block 24, the weld quality monitor 10 calculates the heat input from the welding apparatus. The heat input is a mathematical combination of the arc voltage, arc current and travel speed, according to the following equation:

$$HI = \frac{(V)(A)(60)}{S} \quad (1)$$

wherein:
HI = heat input in Joules per inch;
V = voltage in volts;
A = current in amperes; and
S = travel speed in inches per minute.

Since variations in heat input can cause various weld defects as discussed hereinabove, it is essential that this parameter be monitored. The normal maximum for heat input for standard field processes is 55,000–60,000 Joules per inch. The optimum value in this range desired for the system would be stored in the reference source 24 and compared with the heat input/output signal from module 22 in a separate comparator in block 18. One of alarms 28 and 30 would be activated if the calculated value of the heat input deviates from the reference value.

The cross-sectional area of the weld bead is useful as an indicator of weld metal mechanical properties. Further, it has been shown that a relationship exists between the weld bead cross-sectional area and cooling rates. This cross-sectional area is referred to as the nugget area, and is related to arc current and speed by the following mathematical relationship:

$$NA = 122 \times 10^{-7} \times \frac{I^{1.55}}{S^{.0903}} \quad (2)$$

where
NA = nugget area in square inches;
I = arc current in amperes; and
S = arc travel speed in inches per minute.

The above equation can readily be solved by known circuit components by one of the analog computer modules in block 22, which receives inputs indicative of arc current and travel speed. A signal indicative of nugget area is transmitted to a comparator in block 18 and compared to a desired value received from the reference source 24. When the nugget area deviates from that desired, alarms 28 or 30 are activated depending on whether the nugget area size is larger or smaller than that dictated by the reference source signal from block 24.

Control of the cooling rate is essential in preventing undesirable microstructure in the weld bead and heat-affected base plates. The cooling rate can be controlled by proper control of arc voltage, arc current, travel speed, heat input and weld nugget area. However, it is also useful to have a real-time indication of the cooling rate of the weld bead in order to provide the operator with a warning signal when the cooling rate deviates from that desired. Often, the metal to be welded is preheated by approximately 200° F. by, for example, electric resistance heaters or infrared heaters for the purpose of controlling the weld metal cooling rate. The cooling rate is also affected by the welding machine heat input and the temperature of the weld bead produced. Cooling rate is related to heat input, preheat temperature and weld metal temperature by the following mathematical equation:

$$CR = \frac{M(T - T_0)^2}{HI} \quad (3)$$

where
  CR = cooling rate;
  T = test temperature;
  $T_0$ = preheat temperature;
  HI = heat input; and
  M = constant.

The above nugget area equation can be solved continuously in the analog module using the heat input computed according to equation (1) above, once the preheat temperature and test temperature are known. The preheat temperature is inputted to the analog module by the welding machine operator, while the test temperature is derived from the speed sensor as will be discussed hereinafter. An output signal indicative of nugget area would be supplied via line 20 to a separate comparator in block 18 where it is compared to a reference signal from reference source 24. Variations between these signals would cause high or low alarms 28, 30, respectively, to be activated.

FIG. 2 shows the weld quality monitor of the present invention physically interconnected with an arc welding machine 40. The arc welding machine includes a weld power supply 42 which provides current through positive lead 44 and electrode holder 46 to electrode 48. A negative lead 50 from power supply 42 is connected to the base plate 52 upon which weld bead 54 is formed.

The input signals to weld quality monitor 10 are provided by various sensors connected to the welding machine. For instance, arc current signal I is derived by the use of a current sensor 60 which is held in proximity to positive lead 44. Current sensor 60 can be of the inductive type, a shunt sensor, or preferably, a Hall effect solid state transducer. The Hall effect transductor provides the least interaction with the welding machine in that it fits around the current carrying cable of lead 44, and measures the magnetic field generated by the current passing through the cable using the well known Hall effect principle.

The voltage input signal is provided by input lines 62, one of which is connected to positive line 44 and the other which is connected to negative line 50.

The speed signal, S, is produced by a speed sensing apparatus 70, which is shown more clearly in FIG. 3. The speed sensing apparatus 70 includes a pair of lenses 72 and 74, which are held in spaced relation along the weld bead 54. Radiation received by the lenses 72 and 74 from the weld bead 54 is focused on fiber optic bundles or light pipes 76 and 78, respectively. This received radiation is then filtered by spectral filters 80 and 82 prior to being transmitted to photosensors 84 and 86, respectively. The signals from photosensors 84 and 86 are amplified and conditioned in circuits 88 and 90 respectively. Output signals from circuits 88 and 90 are transmitted through lines 92 and 94 to a comparator 96. The signals on line 92 and 94 are indicative of the temperature of the weld bead 54 in the areas or zones proximate to the lenses 72 and 74, respectively.

One of the lenses, for example, lens 74, is focused on the weld nugget area formed by the arc. The other, lens 72, is held at a fixed distance behind lens 74. Both lenses move with the welding electrode. Thus, the temperature sensed by lens 74 varies in accordance with welding parameter changes, such as arc voltage and arc current. The temperature sensed by lens 72 also varies according to these same parameters as well as in accordance with the welding electrode speed. Thus, the difference between the temperatures sensed by lenses 74 and 72 is indicative of weld electrode speed as a function of the weld metal cooling rate.

The system is calibrated for the estimated cooling rate factor for the weld metal being used. This having been done, the output of comparator 96 is proportional to the travel speed of the electrode 48 using weld bead 54. This system is described in greater detail in my copending U.S. Pat. application Ser. Nos. 268,219 filed 5/29/81 which is incorporated by reference herein.

Again, with reference to FIG. 2, it will be seen that the components of the speed sensor 70 are easily attached to the welding machine. The fiber optic bundles or light pipes 76 and 78 are connected to the electrode holder 46. The photosensors 84, 86 and associated circuitry 88, 90 are also easily attached to the electrode holder in the position designated by block 98. Lines 92 and 94 carry the signals generated by the photosensors 84, 86 to the comparator 96, which can be mounted in a convenient location. The output of comparator 96 is provided through a line 97 to the weld quality monitor 10.

It will also be understood, with reference to FIG. 3, that the temperature measured by lens 74 is the test temperature T needed in equation (2) above for calculation of the cooling rate. Accordingly, a signal indicative of this temperature can be taken directly from line 94 and transmitted to the module of block 22 used for the cooling rate calculation.

It will be understood that the voltage, current and speed signals as well as the signals produced in response to the calculated parameters of heat input, nugget area and cooling rate can be used for other purposes than simply activating alarms 28, 30. The signals can be used as inputs for controlling an automatic welding machine as would be obvious to one of ordinary skill in the art. Further, the signals can be easily recorded in any suitable manner for later inspection and analysis by welding engineers.

While one specific embodiment of the invention has been illustrated and described in detail herein, it is obvious that many variations and modifications may be made which would be obvious to one of ordinary skill in the art without departing from the spirit of the invention as described in the appended claims.

What is claimed is:

1. A weld quality monitor adapted for use with an electric arc welding machine producing a weld bead, comprising:
   voltage sensor means for producing a signal indicative of weld voltage of said arc welding machine;
   current sensor means for producing a signal indicative of weld current of said arc welding machine;
   speed sensor means for producing a signal indicative of weld speed of said arc welding machine including two noncontacting radiation responsive sensors spaced longitudinally of said weld bead each generating an output signal, and further comprising comparator means responsive to said two output signals for comparing same and producing a signal indicative of temperature difference along said weld bead, wherein said temperature difference is indicative of said weld speed; reference signal generating means for generating reference signals indicative of optimum weld voltage, optimum weld current and optimum weld speed; and comparator means for comparing said reference signals to said weld voltage signal, said weld current signal and said weld speed signal.

2. The monitor as defined in claim 1, further comprising calculator means responsive to said weld voltage signal, said weld current signal and said weld speed signal for producing an output signal indicative of weld heat input.

3. The monitor as defined in claim 2, wherein said heat input signal is produced according the formula:

$$HI = \frac{(V)(A)(C)}{S}$$

where:
HI = heat input;
V = voltage;
A = current;
C = constant; and
S = travel speed.

4. The monitor as defined in claim 1, further comprising calculation means responsive to said weld current signal and said weld speed signal for producing an output signal indicative of weld nugget area.

5. The monitor as defined in claim 4, wherein said weld nugget area signal is produced according to the formula:

$$NA = \frac{122 \times 10^{-7} I^{1.55}}{S^{.0903}}$$

where:
NA = nugget area;
I = current; and
S = arc travel speed.

6. The monitor as defined in claim 1, wherein said noncontacting radiation responsive sensor comprises a photosensor, and a fiber optic element having a first end disposed adjacent the weld bead being produced by said arc welding machine and having a second end disposed adjacent said photosensor.

7. The monitor as defined in claim 1, wherein said current sensor means comprises a Hall effect transducer.

8. The monitor as defined in claim 1, further comprising calculation means for producing a signal indicative of cooling rate as a function of said heat input signal, preheat temperature and test temperature.

9. The monitor as defined in claim 8, wherein said speed sensor means comprises temperature sensing means for producing a signal indicative of the test temperature.

10. The monitor as defined in claim 9, wherein said temperature sensing means comprises means for receiving radiation.

* * * * *